(12) United States Patent
Adams et al.

(10) Patent No.: US 9,251,295 B2
(45) Date of Patent: Feb. 2, 2016

(54) DATA FILTERING USING FILTER ICONS

(75) Inventors: Tina M. Adams, San Jose, CA (US); Steven M. Tamekuni, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 13/222,526

(22) Filed: Aug. 31, 2011

(65) Prior Publication Data
US 2013/0055161 A1 Feb. 28, 2013

(51) Int. Cl.
*G06F 17/30* (2006.01)

(52) U.S. Cl.
CPC .................. *G06F 17/30994* (2013.01)

(58) Field of Classification Search
CPC .............. Y10S 715/968; Y10S 707/99933; G06F 17/30864; G06F 17/30991; G06F 3/048; G06F 3/0482; G06F 17/30; G06F 17/30067; G06F 17/30554; G06F 17/30997; G06F 3/0237; G06F 3/0484; G06F 17/30011; G06F 17/30761; G06F 17/30867; G06F 2200/1613; G06F 17/30699; G06F 17/30828; G06F 17/30705; G06F 17/30707
USPC ................... 715/713, 811, 853, 968
See application file for complete search history.

(56) References Cited

U.S. PATENT DOCUMENTS

| | | | |
|---|---|---|---|
| 5,644,736 A | 7/1997 | Healy et al. | |
| 6,003,034 A * | 12/1999 | Tuli | G06F 17/30067 |
| 6,112,201 A * | 8/2000 | Wical | G06F 17/30572 |
| 6,341,280 B1 | 1/2002 | Glass et al. | |
| 6,484,190 B1 | 11/2002 | Cordes et al. | |
| 7,421,421 B2 * | 9/2008 | Newbold | G06F 17/30867 |
| 7,432,940 B2 * | 10/2008 | Brook | G11B 27/11 345/629 |
| 7,437,686 B1 | 10/2008 | Bernstein et al. | |
| 7,765,225 B2 * | 7/2010 | Robert | G06F 17/3064 707/765 |
| 8,095,893 B2 * | 1/2012 | Stewart | G06Q 10/06 715/751 |
| 2001/0044758 A1 * | 11/2001 | Talib | G06F 17/30622 705/26.1 |
| 2002/0080180 A1 * | 6/2002 | Mander | G06F 3/0483 715/769 |
| 2002/0152190 A1 * | 10/2002 | Biebesheimer et al. | 707/1 |
| 2004/0199539 A1 | 10/2004 | Richardson et al. | |
| 2004/0205448 A1 * | 10/2004 | Grefenstette | G06F 17/30867 715/230 |
| 2004/0230461 A1 * | 11/2004 | Talib | G06F 17/30622 705/50 |
| 2005/0240580 A1 * | 10/2005 | Zamir | G06F 17/30867 |
| 2005/0246331 A1 * | 11/2005 | DeVorchik | G06F 17/30235 |
| 2005/0246640 A1 * | 11/2005 | Lacy | G06F 17/30067 715/713 |
| 2005/0278656 A1 * | 12/2005 | Goldthwaite | G06F 17/30775 715/810 |
| 2006/0004716 A1 * | 1/2006 | Hurst-Hiller | G06F 17/30867 |
| 2006/0047673 A1 | 3/2006 | Molander et al. | |
| 2006/0059185 A1 * | 3/2006 | Bocking | G06F 17/30994 |

(Continued)

OTHER PUBLICATIONS

Filter-tree-table: Advanced Java/swing Table and Tree components, Google code, 2011.

(Continued)

*Primary Examiner* — Shen Shiau
(74) *Attorney, Agent, or Firm* — Patterson & Sheridan, LLP

(57) ABSTRACT

Techniques are described for filtering a list of data objects based on a user selection of one or more filter icons. Embodiments provide an interface including a plurality of filter icons in a graphical user interface, with each of the filter icons associated with at least one respective class of data objects. A selection of at least one of the filter icons is received. In response to the received selection, embodiments output a portion of the list of data objects that contains only data objects from the classes of data objects that are associated with the selected at least one filter icon.

20 Claims, 6 Drawing Sheets

(56) References Cited

U.S. PATENT DOCUMENTS

| | | | |
|---|---|---|---|
| 2006/0173710 A1* | 8/2006 | Komischke | G06Q 10/10 705/2 |
| 2006/0270203 A1 | 11/2006 | Coolbaugh et al. | |
| 2007/0061746 A1* | 3/2007 | Folting | G06F 9/4443 715/764 |
| 2007/0088690 A1* | 4/2007 | Wiggen | G06F 17/30106 |
| 2008/0046407 A1* | 2/2008 | Shah | G06F 17/30973 |
| 2008/0115082 A1* | 5/2008 | Simmons | G06N 5/02 715/804 |
| 2008/0120289 A1* | 5/2008 | Golan | G06F 17/30696 |
| 2008/0244428 A1* | 10/2008 | Fain | G06F 17/30651 715/764 |
| 2008/0301165 A1* | 12/2008 | Kim et al. | 707/101 |
| 2009/0177618 A1* | 7/2009 | Schneider | G06F 17/30286 |
| 2010/0228721 A1* | 9/2010 | Mok | G06F 19/322 707/711 |
| 2010/0281047 A1* | 11/2010 | Danninger | G06F 3/0482 707/769 |
| 2011/0035705 A1* | 2/2011 | Faenger | G06F 17/30053 715/811 |
| 2011/0055756 A1 | 3/2011 | Chen et al. | |
| 2011/0119627 A1* | 5/2011 | Cho et al. | 715/811 |
| 2011/0197145 A1* | 8/2011 | Huang | G06Q 10/107 715/752 |
| 2012/0203766 A1* | 8/2012 | Hornkvist | G06F 17/30112 707/722 |
| 2013/0007061 A1* | 1/2013 | Luomala | G06F 3/04883 707/776 |

OTHER PUBLICATIONS

Gotze, Marcel et al., Magic Pages—Providing Added Value to Electronic Documents, Proceedings of HCI International, Jun. 2003, pp. 651-655, Lawrence Erlbaum Associates, Inc., Mahwah, New Jersey, United States.

Nation, David et al., Browse Hierarchical Data with the Degree of Interest Tree, 2002, CiteSeerx, University Park, Pennsylvania, United States.

* cited by examiner

DATA FILTERING USING FILTER ICONS

BACKGROUND

Embodiments presented in this disclosure generally relate to human-computer interfaces and, more particularly, to techniques for filtering a list of data objects using filter icons.

Computer systems and computerized devices are increasingly a part of everyday life. At the same time, the amount of data being created and stored by these computers is rapidly increasing. While advancements in storage technology have made it possible to store massive amounts of data for a relatively low cost, these advancements have presented new challenges as well. One such challenge is that, as the amount of data grows, it is becoming increasingly difficult to effectively organize and present this data to users without overloading the users with information. For instance, a particular user may wish to view only a list of saved email messages within a portion of the file system, rather than the entire list of files in the file system. This challenge is particularly prevalent in shared environments (e.g., a content management system), where a substantial number of users can each create numerous data objects that may be accessible by the other users within the environment.

One technique for sorting through large numbers of data objects is for each user to manually create search queries specifying particular criteria describing data objects the user wishes to view. However, one disadvantage to such a technique is that creating search queries can be a time consuming process. For example, to view a list of saved email messages within a portion of a file system, the user would need to first determine a list of known file extensions used for saving email messages. Additionally, such a technique may not be suitable for less sophisticated users who are not familiar with various file extensions used for the storage of email messages or even the syntax of the query languages. Furthermore, even a properly crafted search for known file extensions may miss data objects were improperly labeled.

SUMMARY

Embodiments of the invention provide a method, product and system for displaying data. The method, product and system include providing a plurality of filter icons in a graphical user interface, where each of the plurality of filter icons is associated with a respective class of data objects. Additionally, the method, product and system include receiving a selection of at least one of the plurality of filter icons. The method, product and system also include, responsive to the received selection, outputting for display a list of data objects, wherein the list of data objects contains only data objects from the classes of data objects associated with the selected at least one filter icon.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Generally, embodiments of the invention provide techniques for filtering a list of data objects based on a user selection of one or more filter icons. Embodiments may classify each data object in the list of data objects into one or more classes. An interface for displaying a list of data objects and including a plurality of filter icons may be provided to a user, with each of the filter icons associated with at least one respective class of data objects. For example, the interface could contain a filter icon for the "Documents" class of data objects and another filter icon for the "Emails" class of data objects. The user may select at least one of the filter icons from the interface. In response to the selection from the user, embodiments output a portion of the list of data objects that contains only data objects from the classes of data objects that are associated with the selected filter icons. Continuing the example, if the user selects only the filter icon associated with the "Documents" class of data objects, embodiments could filter out all the data objects from the list of data objects that have not been classified in the "Documents" class. Advantageously, doing so provides a quick and intuitive way for the user to adjust which types of data objects are displayed on the interface.

Figure 1:
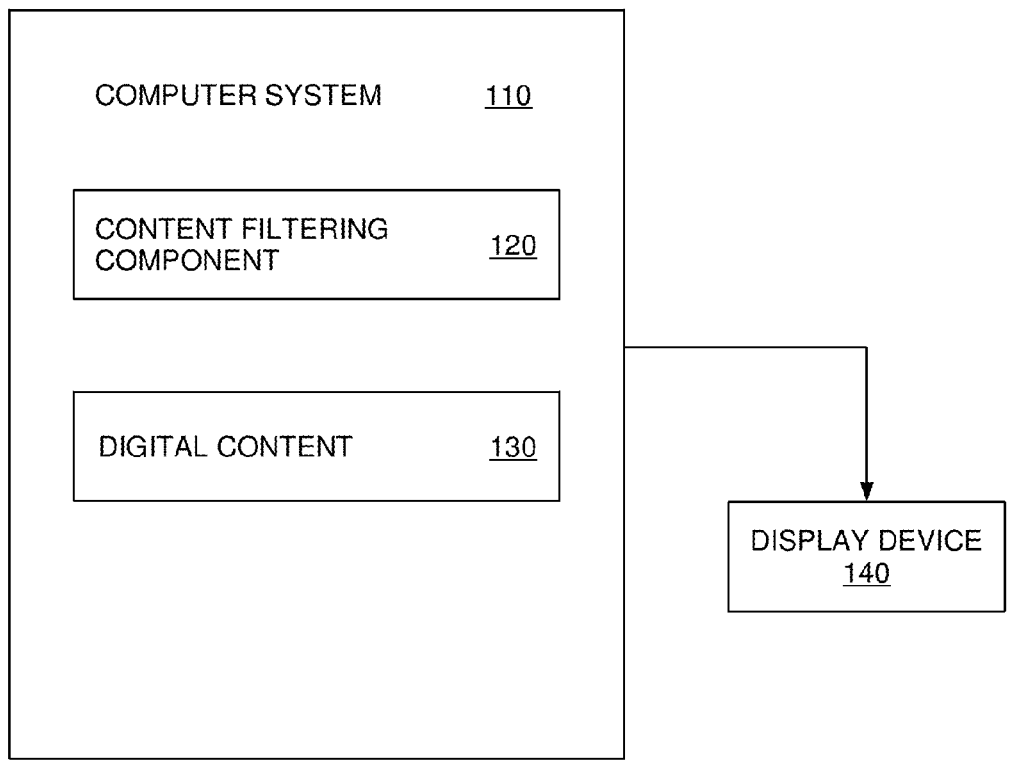
FIG. 1 is a block diagram illustrating a system configured to run a content filtering component, according to one embodiment presented in this disclosure.

FIG. 1 is a block diagram illustrating a system configured to run a content filtering component, according to one embodiment presented in this disclosure. As shown, the system 110 includes a content filtering component 120 and digital content 130. Additionally, the system 110 is communicatively coupled to a display device 140. Generally, the content filtering component 120 is configured to output for display (e.g., on the display device 140) a filtered list of data objects from the digital content 130 based on a user selection of one or more filter icons. The digital content 130 generally represents any data objects that are stored in digital form. Examples of digital content 680 include, without limitation, files on a filesystem, files in a content management system, search results, and so on. For instance, the user could specify a particular location within a filesystem where the data objects in the list of data objects reside. Embodiments of the present invention could then display a filtered list of data objects based on the selection by the user of one or more filter icons.

The content filtering component 120 may classify each of the data objects in the digital content 130 into one or more classifications. For instance, the content filtering component 120 may classify a first data object as a "Documents" and a second data object as an "Emails". In one embodiment, the content filtering component 120 classifies the data objects based on a file extension associated with the data objects. For example, the "Documents" class could be associated with a plurality of different file extensions that are commonly used by Word Processing programs for storing documents. If the content filtering component 120 then determines that a first data object has one of these file extensions, the content filtering component 120 could associate the first data object with the "Documents" class.

Upon classifying the data objects, the content filtering component 120 could provide an interface for viewing a list of data objects. Generally, such an interface includes a set of user-selectable filter icons. Each of these filter icons may be associated with one or more classes and/or sub-classes of data objects. Upon receiving a selection of one or more filter icons, the content filtering component 120 could determine a list of the data objects that contains data objects only from classes and/or sub-classes associated with the selected filter icons. As an example, if the user selects only a filter icon associated with the "Document" classification, the content filtering component 120 could display a list of only data objects that were classified into the "Document" class. In other words, such a list would exclude data objects that do not belong to the classes associated with the selected filter icons. Advantageously, doing so provides a way for users to quickly and intuitively adjust the types of data objects that are displayed, which enables users to more easily sort through large amounts of data objects.

In another embodiment, the content filtering component 120 could analyze the contents of a data object in order to classify the data object. As an example, the content filtering component 120 could analyze the content of a second data object and determine that the second data object contains the strings "TO:", "FROM:", "CC:" and "SUBJECT:". The content filtering component 120 could then determine that these strings are commonly associated with the "Emails" class of data objects and could accordingly classify the second data object as an "Emails". In a particular embodiment, the content filtering component 120 could further classify data objects into sub-classes. For example, a particular organization could regularly send out weekly status updates by email with the subject of "Weekly Status Update for the Week of [Month] [Date], [Year]". In such a situation, the content filtering component 120 could be configured to analyze the content of data objects to not only determine whether the data objects should be classified as "Emails" but to further determine whether the data object should be classified as the sub-class "Status Update Emails." For instance, if the content filtering component 120 determines that the second data object not only contains the strings "TO:", "FROM:", "CC:" and "SUBJECT:", but further contains the string "Weekly Status Update for the Week of" following the string "SUBJECT:", the "TO:", "FROM:", "CC:" and "SUBJECT: could further classify the second data object as a "Status Update Emails."

In a particular embodiment, the content filtering component 120 can classify data objects into multiple classifications. For example, assume a user took a screen capture of his desktop with an email message open the desktop to produce a third data object (e.g., an image file). In such a situation, the content filtering component 120 could analyze the third data object produced by the screen capture and determine that the data object should be classified as an "Image" based on the file extension of the data object. The content filtering component 120 could further analyze the content of the data object in order to further classify the data object. For example, the content filtering component 120 could perform Optical Character Recognition ("OCR") on the image file to identify text within the data object. If the content filtering component 120 then determines that the image file contains the text strings "TO:", "FROM:", "CC:" and "SUBJECT:", the content filtering component 120 could further classify the third data object as an "Email." As a result, the third data object could be classified into both the "Image" and "Email" classifications.

The content filtering component 120 may also classify data objects based on security properties of the data objects. For instance, the content filter component 120 could classify all data objects that were created by a particular user into a "Personally Owned" class of data objects. The content filter component 120 could determine which user created the data objects by, for instance, analyzing metadata associated with the data objects. The content filter component 120 could be configured to classify these documents for each user, so that each user is able to view a list of data objects that he or she created. Thus, if the particular user then selects the filter icon associated with the "Personally Owned" class, the content filter component 120 could be configured to display a list of data objects that were created by the particular user. Doing so enables the user to quickly filter out data objects that were created by other users of the system.

As another example, the content filter component 120 could classify data objects that have been flagged as confidential communications into a "Confidential" class of data objects. For instance, the content filter component 120 could analyze security-related metadata for each of the data objects to determine which of the data objects have been flagged as confidential communications and could classify each of the flagged data objects into the "Confidential" class of data objects. If a user then selects the filter icon associated with the "Confidential" class, the content filter component 120 could display a list of data objects that have been flagged as confidential. The user could further combine such a selection with a selection of another filter icon in order to refine the displayed list to show a particular type of confidential data objects. As an example, the user could select filter icons associated with the "Confidential" class and the "Documents" class of data objects in order to see a listing of word processing documents that have been flagged as confidential communications. Advantageously, doing so allows the user to intuitively filter a listing of data objects based not only on the content classifications of the data objects but further on security-related classifications of the data objects.

In one embodiment, the content filtering component 120 is configured to filter certain data objects for purposes of packaging the data objects into an archive (e.g., a compressed archive file such as a .ZIP file). In such an embodiment, the content filtering component 120 could receive a user selection of one or more filter icons and could package a set of data objects that includes only data objects from classes associated with the selected filter icons into an archive. In a particular embodiment, the content filtering component 120 allows users to create such an archive that contains data objects that the user is not allowed to read or to modify (e.g., due to security permissions on the data objects). Advantageously, such an embodiment allows a user to create an archive containing all the data objects of a certain class of data objects, even though the user may not have the security permissions to otherwise interact with each those data objects. That is, since the user may not be able to open certain ones of the data objects, the user may not otherwise be able to manually classify the data objects and determine which of the data objects to include in the archive. However, by classifying the data objects and allowing the user to select particular classes of data objects to include in the archive (e.g., using filter icons), the content filtering component 120 may enable the user to efficiently archive particular classes of data objects regardless of the security permissions on those data objects.

As an example, a first user could be tasked with packaging all the emails and documents for a particular organization as part of the discovery process for a lawsuit. In such an example, the first user could interact with an interface for the content filtering component 120 and select filter icons associated with the "Emails" and "Documents" classes of data objects. The content filtering component 120 could then create a secured archive containing all the data objects from the selected classes of data objects, regardless of whether the first user has the security permissions to interact with these data objects. That is, embodiments allow the first user to create the archive of the data objects, even though the first user may not be able to examine the contents of each of the data objects in order to manually classify the data objects. Advantageously, doing so allows the first user to easily and intuitively create an archive containing select classes of data objects, without being limited by any security restrictions.

Figure 2:
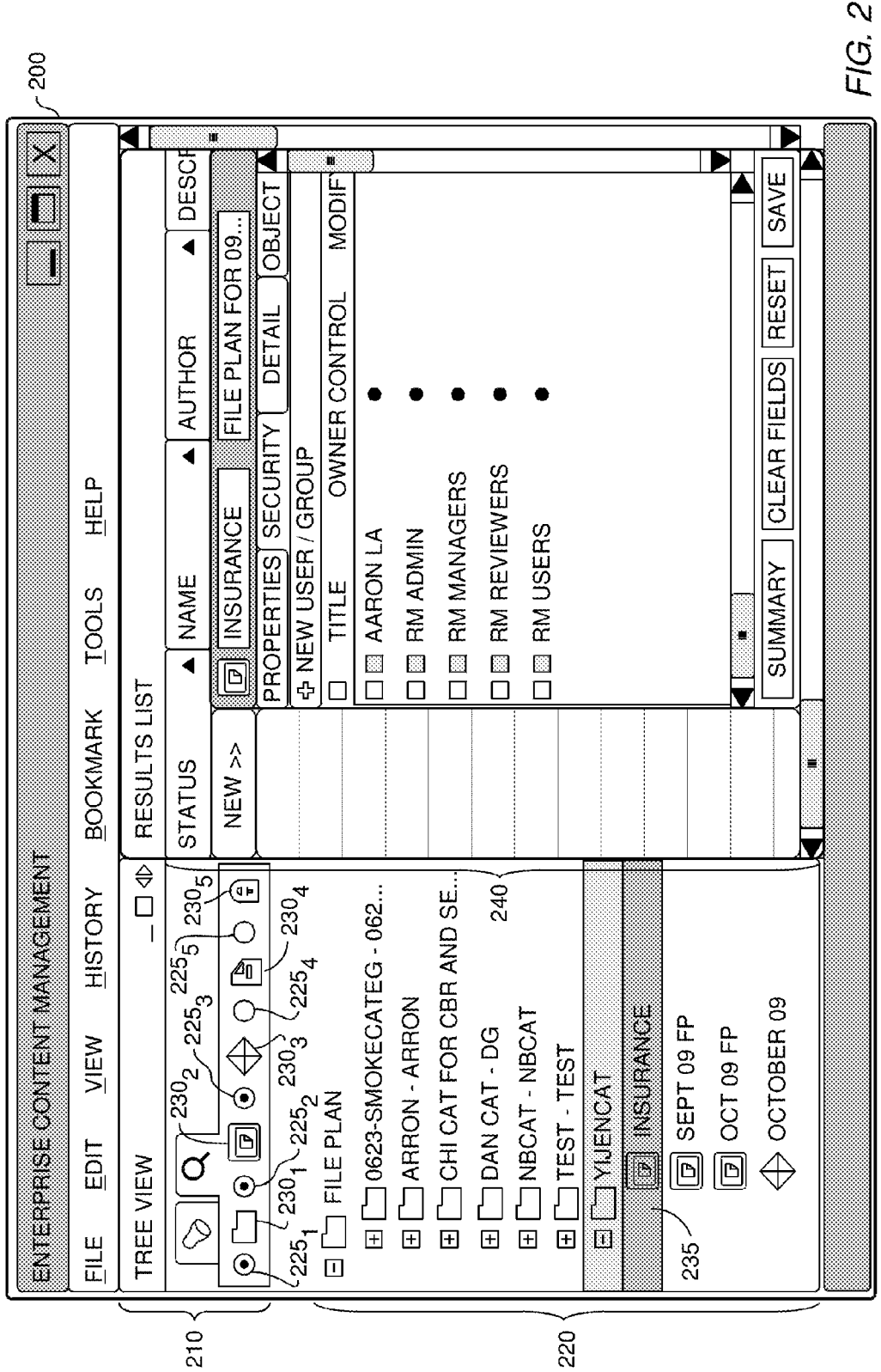
FIG. 2 is a screenshot of an interface for an application configured with a content filtering component, according to one embodiment presented in this disclosure.

FIG. 2 is a screenshot of an interface for an application configured with a content filtering component, according to one embodiment presented in this disclosure. As shown, the screenshot 200 includes a content filtering component interface 210, a data object listing interface 220, and a data object display interface 240. The content filtering component interface 210 includes a plurality of filter icons 230 and filter icon radio boxes 225. The data object listing interface 220 includes a selected data object 235. The data object display interface 240 generally shows the contents of the selected data object 235. Thus, in the depicted example, the data object display interface 240 shows the contents of the document "INSURANCE" from the folder "YIJENCAT".

For purposes of the present example, assume that the filter icon $230_1$ relates to the "Folder" class of data objects, the filter icon $230_2$ relates to the "Financial Reports" sub-class of data objects, the filter icon $230_3$ relates to the "Emails" class of data objects, the filter icon $230_4$ relates to the "Documents" class of data objects, and the filter icon $230_5$ relates to the "Confidential" class of data objects. For this example, assume that the "Financial Reports" is a sub-class of the "Documents" class of data objects, and further assume that the "Confidential" class of data objects includes all data objects having security permissions that indicate the data objects are confidential communications. Returning to the depicted example, the screenshot 200 shows that filter icon radio boxes $225_1$, $225_2$ and $225_3$ have been selected. These filter icons $225_1$, $225_2$ and $225_3$ correspond to filter icons $230_1$, $230_2$ and $230_3$, respectively.

Thus, the content filtering component 120 could analyze the selected radio boxes $225_{1-3}$ and determine that the user has selected the filter icons corresponding to the classes and sub-classes of "Folders", "Financial Reports" and "Emails". Based on the selection by the user, the content filtering component 120 could display a list of data objects in the data object listing interface 220 that includes only data objects from the classes and sub-class of "Folders", "Financial Reports" and "Emails". Doing so enables the user to quickly filter the contents shown in the data object listing interface 220 by selecting the filter icons $230_{1-5}$ (e.g., using the radio boxes $225_{1-5}$) that correspond with the classes and sub-classes of data objects the user wishes to be displayed.

Figure 3:
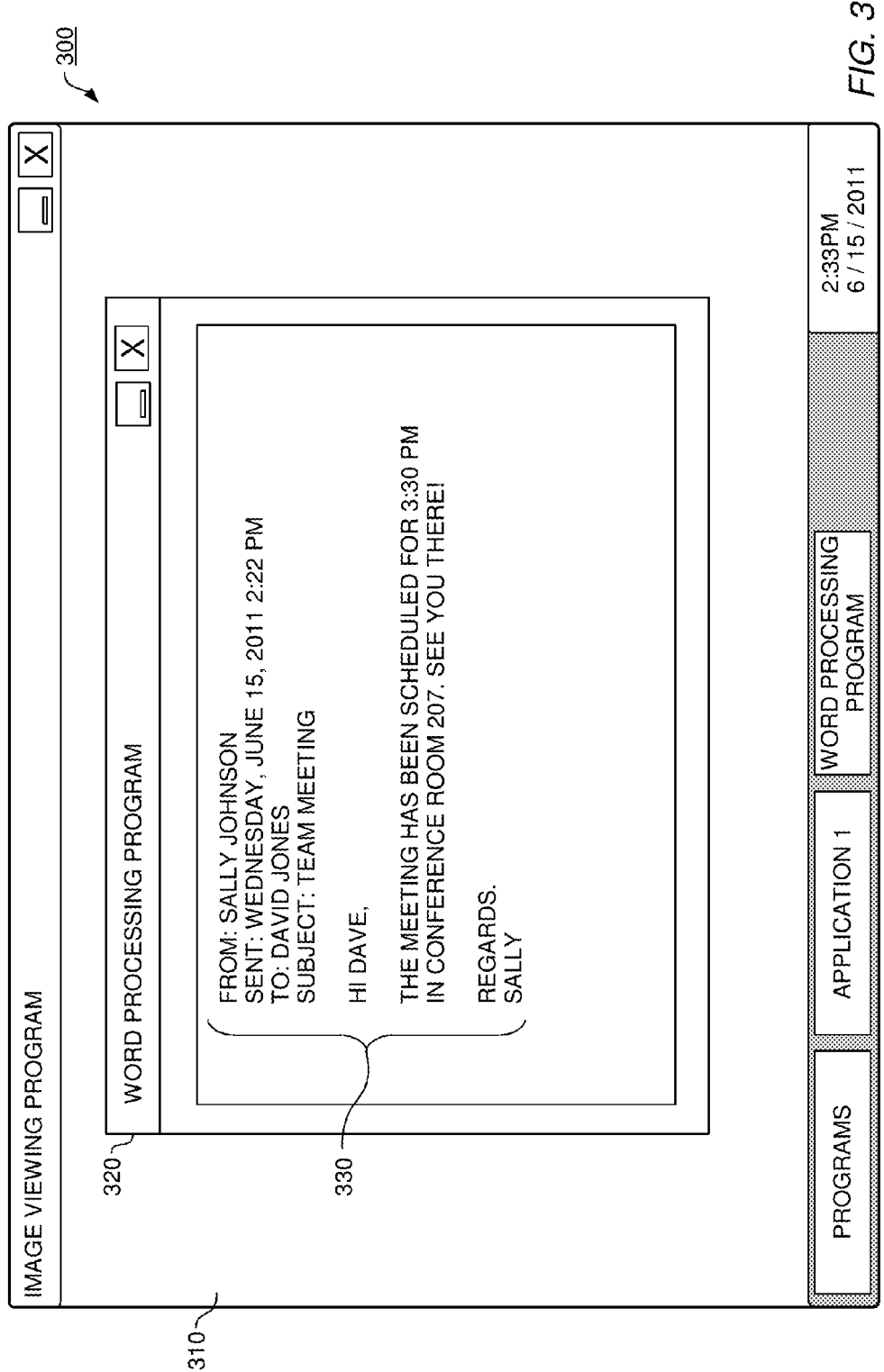
FIG. 3 is a screenshot of a data object, according to one embodiment presented in this disclosure.

As discussed above, the content filtering component 120 may classify data objects based on a number of factors and in a variety of different ways. In one embodiment, the content filtering component 120 is configured to analyze the content of a data object in order to classify the data object into one or more classifications. Such analysis may enable the content filtering component 120 to accurately classify data objects, even in situations where a user may attempt to mask the proper classification of the data object. An example of one such data object is shown in FIG. 3, which depicts a screenshot of a data object according to one embodiment presented in this disclosure. For purposes of the present example, assume that a user pasted the contents of an email message into a word processing document and then took a screenshot of the document open in a word processing program. As shown, the screenshot 300 depicts an image viewing program showing a second screenshot 310 of a desktop of a computer system. The second screenshot 310 includes a word processing program 320, which includes a document containing the contents 330 of an email message.

Here, the content filtering component 120 could analyze the second screenshot 310 and classify the screenshot 310 into the "Images" class of data objects. Additionally, the content filtering component 120 could analyze the content of the screenshot 310 and determine that the screenshot 310 depicts the document 330 in a word processing program 320. Based on such analysis, the content filtering component 120 could further classify the screenshot 310 into the "Documents" class of data objects. Furthermore, the content filtering component 120 could analyze the text of the document 330 (e.g., using OCR) and determine that the document 330 includes the strings "FROM:", "SENT:", "TO:", and "SUBJECT:". As such, the content filtering component 120 could further classify the screenshot 310 into the "Emails" class of data objects, as the document 330 contains the contents of an email message. Thus, the content filtering component 120 could classify the screenshot 310 into the "Images", "Documents" and "Emails" category based on the analysis of the screenshot 310. Advantageously, doing so allows the content filtering component 120 to classify data objects not only based on their file extensions (i.e., an image file in the current example) but to further classify data objects based on their contents (i.e., a document and the contents of an email message in the current example).

Figure 4:
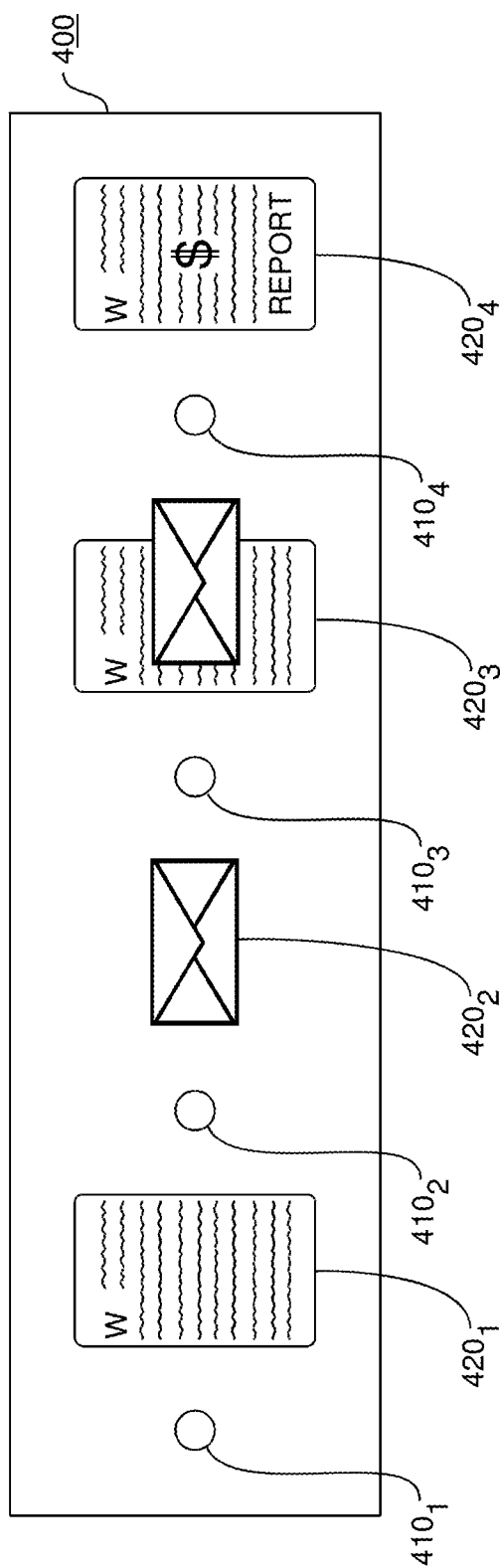
FIG. 4 is a screenshot of an interface for a content filtering component, according to one embodiment presented in this disclosure.

As discussed above, the content filtering component 120 may provide filter icons that represent sub-classes of data objects. For instance, a "Financial Reports" sub-class may refer to specific types of data objects within the "Documents" class of data objects. In one embodiment, the content filtering component 120 may provide filter icons that represent multiple classes of data objects. Examples of such filter icons are shown in FIG. 4, which is a screenshot of an interface for a content filtering component, according to one embodiment presented in this disclosure. As shown, the screenshot 400 includes filter icons $420_{1-4}$, each associated with a corresponding radio button $410_{1-4}$. In the depicted example, the filter icon $420_1$ represents the "Documents" class of data objects and the filter icon $420_2$ represents the "Emails" class of data objects. Additionally, the filter icon $420_3$ represents both the "Documents" and "Emails" classes of data objects. Such a filter icon $420_3$ may be advantageous when multiple classes of data objects (i.e., in this example the "Documents" and "Emails" classes) are frequently selected together.

The filter icon $420_4$ represents the sub-class of "Financial Reports", which in this example is a sub-class of the "Documents" class of data objects. In such an example, the content filtering component 120 could analyze the contents of the data objects classified in the "Documents" class in order to determine which of the data objects should be further classified into the sub-class of "Financial Reports." For instance, the content filtering component 120 could be configured to analyze the content and the structure of content within the data object in order to classify the data object. That is, the content filtering component 120 could be configured to associate a particular structure with the "Financial Reports" sub-class and upon determining a data object uses this particular structure, could classify the data object into the "Financial Reports" sub-class. For example, the content filtering component 120 could be pre-configured with the information that every financial report document contains at least the sections of "Balance Sheet," "Profit and Loss" and "Analysis." Upon determining that a data object within the "Documents" class contains these sections, the content filtering component 120 could further classify the data object into the "Financial Reports" sub-class based on the structure of the data object. Advantageously, by allowing users to filter data objects based on the sub-classifications of data objects, embodiments provide a finer level of granularity by which users may filter data objects.

In one embodiment, the content filtering component 120 provides a preconfigured set of filter icons to a particular user. For instance, such a preconfigured set of filter icons could be set by a system administrator. As another example, the particular user could select which filter icons should be included in the preconfigured set of filter icons. In another embodiment, the content filtering component 120 determines the set of filter icons to display to the particular user based on user information for the particular user. For example, the content filtering component 120 could be configured to display a certain set of filter icons to all users within the "Engineering" group of users. Upon determining the particular user belongs to the "Engineering" group of users, the content filtering component 120 could display the certain set of filter icons to the particular user.

In an alternate embodiment, the content filtering component 120 determines which filter icons to display to the particular user based on previous interactions between the particular user and various classes of data objects. For instance, the content filtering component 120 could monitor actions of the particular user and maintain historical data characterizing which classes of data objects the user interacts with. As an example, the content filtering component 120 could monitor actions of the particular user and, upon determining the user is interacting with a data object, the content filtering component 120 could determine one or more classes that the data object belongs to. The content filtering component 120 could then update interaction data which the content filtering component 120 maintains for the particular user, based on the determined one or more classes to which the data object belongs. The content filtering component 120 could then use this interaction data for the particular user to determine which filter icons should be presented to the particular user. As an example, the content filtering component 120 could analyze the interaction data to determine the five classes of data objects with which the particular user most frequently interacts and could display the filter icons associated with these five classes to the user. Doing so helps to ensure that the content filtering component 120 provides the user with a set of filter icons that will be relevant to the particular user.

Figure 5:
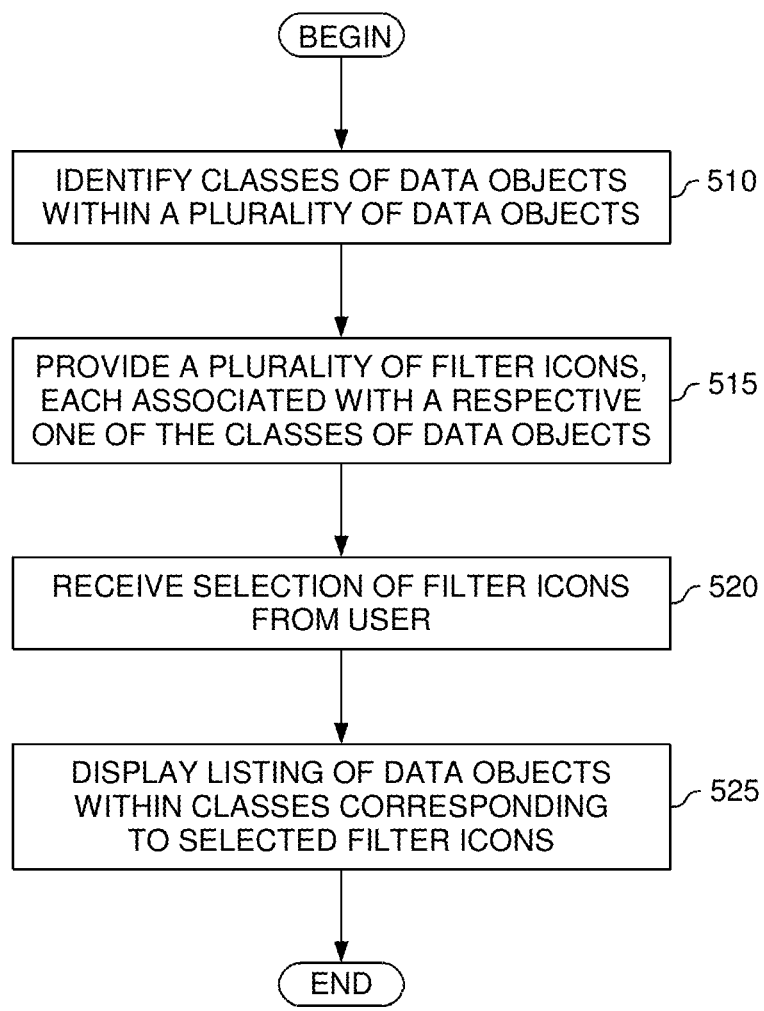
FIG. 5 is a flow diagram illustrating a method for filtering data objects using filter icons, according to one embodiment presented in this disclosure.

FIG. 5 is a flow diagram illustrating a method for filtering data objects using filter icons, according to one embodiment presented in this disclosure. As shown, the method 500 begins at step 510, where the content filtering component 120 classifies each of the data objects within a plurality of data objects. As discussed above, the content filtering component 120 could classify the data objects based on the respective file extension of each data object. In particular embodiments, the content filtering component 120 is configured to classify the data objects based on the content contained within the data objects. Examples of such content include, without limitation, content expressed in plain text within the data object, content expressed in a mark-up language within the data object, content mined from the data object (e.g., using OCR), and so on. In analyzing the content of the data objects, the content filtering component 120 could search for particular characters or objects within the data objects for use in classifying the data objects. For example, upon determining a particular data object contains the strings "TO:", "FROM:", "CC:" and "SUBJECT:", the content filtering component 120 could classify the data object as an "Email". In one embodiment, the content filtering component 120 is configured to compare the structure of the data object to one or more predefined templates in order to classify the data objects.

Once the data objects are classified, the content filtering component 120 provides an interface containing a plurality of filter icons, with each filter icon associated with a respective class of data objects (step 515). In one embodiment, the filter icons can be associated with multiple classes of documents. For instance, an exemplary filter icon could be associated with both the "Document" and "Email" classifications. In a particular embodiment, the filter icons can be further associated with sub-classifications of data objects. As an example, a particular data object could be associated with the "Document" classification and further associated with the "Financial Report" sub-classification.

The content filtering component 120 then receives a selection of one or more of the filter icons from a user (step 520). For instance, the user could select one of the filter icons by clicking on the filter icon itself (e.g., using a mouse, a touch screen display, etc.). In one embodiment, the content filtering component 120 may associate each of the filter icons with a respective radio button or checkbox. In such an embodiment, the user may select a filter icon by clicking on its respective radio button or checkbox. Of course, these examples are provided without limitation and are for illustrative purposes only. Furthermore, one of ordinary skill in the art will recognize that any number of other techniques could be used to select the filter icons. More generally, it is broadly contemplated that any technique for of selecting filter icons may be used.

The content filtering component 120 then outputs for display a listing of data objects belonging to the classes of data objects that correspond to the selected filter icons (step 525). For example, if the user only selects the filter icon corresponding to the "Email" class of data objects, the content filtering component 120 could display a list only containing data objects that are classified as "Emails". As another example, if the user selects two filter icons corresponding to the "Email" and "Document" classifications, respectively, the content filtering component 120 could display a list containing only data objects classified as "Email" or as "Documents". Doing so provides an intuitive way for the user to efficient specify the types of data objects that should be displayed.

Figure 6:
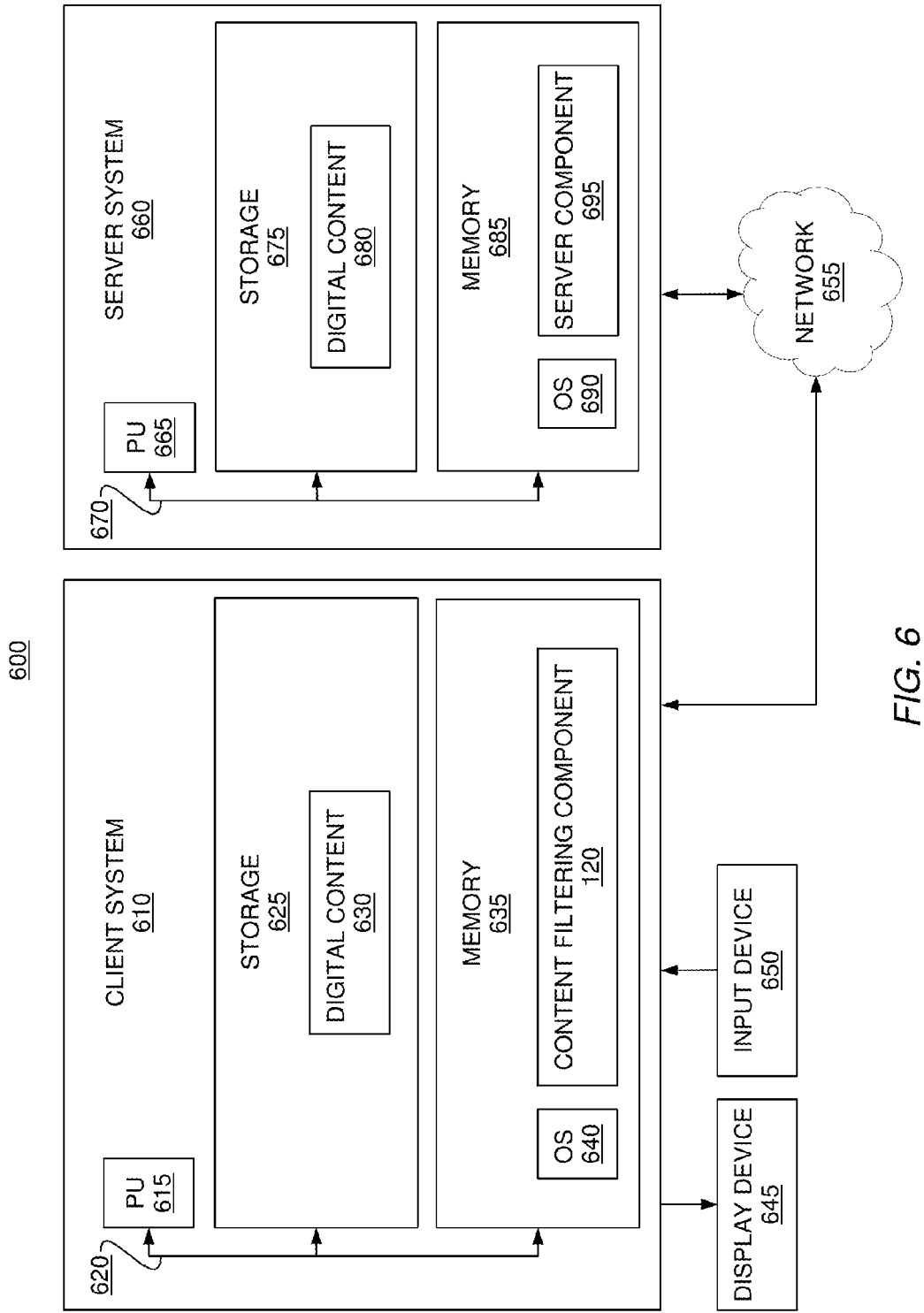
FIG. 6 is a block diagram illustrating a system configured to run a content filtering component, according to one embodiment presented in this disclosure.

FIG. 6 is a block diagram illustrating a system configured to run a content filtering component, according to one embodiment presented in this disclosure. As shown, the system 600 includes a plurality of client systems 610 and a server system 660, communicatively coupled via a network 655. In one embodiment, the client systems 610 may include existing computer systems, e.g., desktop computers, server computers, laptop computers, tablet computers, mobile devices (e.g., mobile phones), gaming consoles, hand-held gaming devices and the like. The client systems 610 illustrated in FIG. 6, however, are merely examples of computer systems in which embodiments of the present invention may be used. Embodiments of the present invention may be implemented differently, regardless of whether the computer systems are complex multi-user computing systems, such as a cluster of individual computers connected by a high-speed network, single-user workstations, or network appliances lacking non-volatile storage. Moreover, it is explicitly contemplated that embodiments of the invention may be implemented using any device or computer system capable of performing the functions described herein.

As shown, each client system 610 includes, without limitation, a processor 615, which obtains instructions and data via a bus 620 from a memory 635 and storage 625. Processor 615 is a programmable logic device that performs instruction, logic, and mathematical processing, and may be representative of one or more CPUs. Storage 625 is representative of hard-disk drives, flash memory devices, optical media and the like. Generally, the storage 625 stores application programs and data for use by the client system 510. As shown, storage 625 contains digital content 630. The digital content 630 generally represents any data objects stored in digital form. Examples of digital content 630 include, without limitation, files on a filesystem, files in a content management system, search results, and so on. The client systems 610 are operably connected to the network 655, e.g., via network interfaces.

The memory 635 is any memory sufficiently large to hold the necessary programs and data structures. Memory 635 could be one or a combination of memory devices, including Random Access Memory, nonvolatile or backup memory (e.g., programmable or Flash memories, read-only memories, etc.). In addition, memory 635 and storage 625 may be considered to include memory physically located elsewhere; for example, on another computer coupled to the client system 610 via bus 620. The memory 635 includes an operating system ("OS") 640 and a content filtering component 120. Operating system 640 is software used for managing the operation of the client system 610. Examples of OS 640 include UNIX, versions of the Microsoft Windows® operating system and distributions of the Linux® operating system. (Note: Linux is a trademark of Linus Torvalds in the United States and other countries.) More generally, any operating system 640 capable of performing the functions described herein may be used.

Additionally, the client systems 610 are each coupled to respective display devices 645 and input devices 650. The display devices 645 may include output devices such as monitors, touch screen displays, and so on. For instance, the display devices 645 may include a display device used to visually depict an interface of the content filtering component 120 and a list of data objects in the digital content 630. The input devices 650 represent a wide variety of input devices, including keyboards, mice, controllers, microphones, and so on.

As shown, the server system 660 includes, without limitation, a processor 665, which obtains instructions and data via a bus 670 from a memory 685 and storage 675. Processor 665 is a programmable logic device that performs instruction, logic, and mathematical processing, and may be representative of one or more CPUs. Storage 675 is representative of hard-disk drives, flash memory devices, optical media and the like. Generally, the storage 675 stores application programs and data for use by the server system 660. As shown, storage 675 contains digital content 680. The digital content 680 generally represents any data objects stored in digital form. Examples of digital content 680 include, without limitation, files on a filesystem, files in a content management system, search results, and so on. The server system 660 is operably connected to the network 655, e.g., via a network interface.

The memory 685 is any memory sufficiently large to hold the necessary programs and data structures. Memory 685 could be one or a combination of memory devices, including Random Access Memory, nonvolatile or backup memory (e.g., programmable or Flash memories, read-only memories, etc.). In addition, memory 685 and storage 675 may be considered to include memory physically located elsewhere; for example, on another computer coupled to the server system 660 via bus 670. The memory 685 includes an OS 690 and a server component 695. Operating system 690 is software used for managing the operation of the server system 660. Examples of OS 690 include UNIX, versions of the Microsoft Windows® operating system and distributions of the Linux® operating system. More generally, any operating system 690 capable of performing the functions described herein may be used. Generally, the server component 695 represents any application capable of providing a list of data objects from digital content 680 to applications running on the client systems 610. In one embodiment, the server component 695 represents a web server configured to provide search results to applications on the client systems 610.

As discussed above, the content filtering component 120 generally provides an interface containing a plurality of filter icons for use in filtering data objects. For instance, the content filtering component 120 could categorize each data object in the digital content 630 into one or more classifications. As an example, a first data object could be classified as a "Document" while a second data object could be classified as an "Email Message". The content filtering component 120 could then provide an interface (e.g., using the display device 645) to display a list of data objects and which includes a plurality of filter icons, with each filter icon representing a respective one or more of the classifications. As an example, the content filtering component 120 could provide a filter icon for "Document" class data objects, "Email Message" class data objects, "Email and Document" classes of data objects, and "Financial Report Document" class data objects. Upon receiving a user selection of at least one of the filter icons, the content filtering component 120 could filter data objects from the list of data objects, based on the filter icons selected by the user. Advantageously, doing so provides a quick and intuitive way for users to specify which types of data objects should be displayed.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user could submit a request for a list of data objects (e.g., using a client application configured with a content filtering component 120) to a server component 695 in the cloud. For example, a web server could execute on a computing system in the cloud and, responsive to a request from the client application, could return a list of data objects stored in the cloud. Upon receiving the list of data objects, a content filtering component 120 could provide an interface to a user which includes a plurality of filter icons, each of which is associated with one or more classifications of data objects, and could filter data objects from the list of data objects based on a user selection of the filter icons. Doing so allows users to filter a list of data objects based on classes of data objects from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method to customize display of data, comprising:
    classifying a plurality of data objects into one or more of a plurality of classes including a first class and further including a second class that is a sub-class of the first class, wherein each of the plurality of data objects is classified based on a file extension associated with the respective data object and based further on at least one of: (i) content within the respective data object; (ii) a structure of the content within the respective data object; and (iii) a predefined template; wherein at least one data object is classified into the second class; wherein at least one data object is classified into multiple classes;
    monitoring a plurality of interactions between a user and one or more classes of the plurality of data objects to maintain historical interaction data of the user;
    providing, based on the historical interaction data, a set of filter icons to include in a graphical user interface, of which a first filter icon is associated with the first class, and of which a second filter icon is associated with the second class;
    outputting the graphical user interface including the plurality of data objects and the plurality of filter icons;
    responsive to a selection of the first and second filter icons, updating the graphical user interface by operation of one or more computer processors and to include a listing of only data objects that correspond to the selected filter icons, wherein the historical interaction data is updated based on user interactions with the data objects that correspond to the selected filter icons; and
    responsive to a request from the user, generating an archive of at least the data objects that correspond to the selected filter icons, despite the user having security permissions precluding the user from reading and modifying at least the data objects that correspond to the selected filter icons.

2. The computer-implemented method of claim 1, wherein each of the plurality of data objects is classifiable based on: (i) the content within the respective data object; (ii) the structure of the content within the respective data object; and (iii) the predefined template.

3. The computer-implemented method of claim 1,
    wherein the set of filter icons includes a particular filter icon corresponding to two classes of the plurality of classes, wherein the computer-implemented method further comprises:
    responsive to a selection of the particular filter icon, updating the graphical user interface to include at least data objects belonging to the two classes the particular filter icon corresponds to.

4. The computer-implemented method of claim 1, wherein the plurality of data objects comprises at least one of: (i) files on a file system; (ii) objects in a content management system; and (iii) web documents included in a set of search results.

5. The computer-implemented method of claim 1
    wherein the graphical user interface is updated by a content filtering component, wherein the plurality of data objects is classified without requiring any user input explicitly specifying any class of any of the plurality of data objects, wherein one or more of the set of filter icons are not selected, wherein one or more data objects from the plurality of data objects corresponding to the one or more of the set of filter icons that are not selected, are filtered out from the updated graphical user interface.

6. The computer-implemented method of claim 5, wherein the archive is for use in electronic discovery, wherein the archive is generated to facilitate an electronic discovery process, wherein the plurality of filter icons are configurable based on, respectively, each of: (i) user input from a system administrator of the content filtering component; (ii) user input from an end-user of the content filtering component; and (iii) group membership of the end-user;
    wherein the plurality of filter icons are programmatically selected for inclusion in the graphical user interface, based on the plurality of filter icons representing classes of data objects meeting a frequency of historical interaction by the user, wherein the at least one filter icon is excluded from the graphical user interface due to the at least one filter icon representing a class not meeting the frequency of historical interaction by the user.

7. The computer-implemented method of claim 6, wherein each filter icon is output for simultaneous display to the user,
    wherein the set of filter icons includes a particular filter icon corresponding to two classes of the plurality of classes, wherein the computer-implemented method further comprises:
    responsive to a selection of the particular filter icon, updating the graphical user interface to include at least data objects belonging to the two classes the particular filter icon corresponds to.

8. The computer-implemented method of claim 7,
    wherein each of the data objects is classified based on: (i) the content within the respective data object, including: (A) markup language; and (B) text mined using optical character recognition; (ii) the structure of the content within the respective data object; (iii) the file extension associated with the respective data object; (iv) the predefined template; (v) one or more security permissions of the respective data object; (vi) a confidentiality indicator associated with the respective data object; and (vii) whether the respective data object is a folder;
    wherein plurality of the data objects comprises at least one of: (i) files on a file system; (ii) objects in a content management system; and (iii) web documents included in a set of search results.

9. The computer-implemented method of claim 1, wherein the archive is for use in electronic discovery, wherein the archive is generated to facilitate an electronic discovery process.

10. A computer program product to customize display of data, comprising:
    a non-transitory computer-readable medium having computer-readable program code embodied therewith, the computer-readable program code executable by one or more computer processors to:
    classify a plurality of data objects into one or more of a plurality of classes including a first class and further including a second class that is a sub-class of the first class, wherein each of the plurality of data objects is classified based on a file extension associated with the respective data object and based further on at least one of: (i) content within the respective data object; (ii) a structure of the content within the respective data object; and (iii) a predefined template; wherein at least one data object is classified into the second class; wherein at least one data object is classified into multiple classes;

monitor a plurality of interactions between a user and one or more classes of the plurality of data objects to maintain historical interaction data of the user;

provide, based on the historical interaction data, a set of filter icons to include in a graphical user interface, of which a first filter icon is associated with the first class, and of which a second filter icon is associated with the second class;

output the graphical user interface including the plurality of data objects and the plurality of filter icons;

responsive to a selection of the first and second filter icons, update the graphical user interface to include a listing of only data objects that correspond to the selected filter icons, wherein the historical interaction data is updated based on user interactions with the data objects that correspond to the selected filter icons; and responsive to a request from the user, generate an archive of at least the data objects that correspond to the selected filter icons, despite the user having security permissions precluding the user from reading and modifying at least the data objects that correspond to the selected filter icons.

11. The computer program product of claim 10, wherein:
each of the plurality of data objects is classifiable based on: (i) the content within the respective data object; (ii) the structure of the content within the respective data object; and (iii) the predefined template.

12. The computer program product of claim 10, wherein the set of filter icons includes a particular filter icon corresponding to two classes of the plurality of classes, wherein the computer-readable program code is further executable to:
responsive to a selection of the particular filter icon, update the graphical user interface to include at least data objects belonging to the two classes the particular filter icon corresponds to.

13. The computer program product of claim 10, wherein the plurality of data objects comprises at least one of: (i) files on a file system; (ii) objects in a content management system; and (iii) web documents included in a set of search results.

14. The computer program product of claim 10, wherein the archive is for use in electronic discovery, wherein the archive is generated to facilitate an electronic discovery process.

15. A system to customize display of data, comprising:
one or more computer processors; and
a memory containing a program that, when executed on the one or more computer processors, performs an operation comprising:
classifying a plurality of data objects into one or more of a plurality of classes including a first class and further including a second class that is a sub-class of the first class, wherein each of the plurality of data objects is classified based on a file extension associated with the respective data object and based further on at least one of: (i) content within the respective data object; (ii) a structure of the content within the respective data object; and (iii) a predefined template; wherein at least one data object is classified into the second class; wherein at least one data object is classified into multiple classes;

monitoring a plurality of interactions between a user and one or more classes of the plurality of data objects to maintain historical interaction data of the user;

providing, based on the historical interaction data, a set of filter icons to include in a graphical user interface, of which a first filter icon is associated with the first class, and of which a second filter icon is associated with the second class;

outputting the graphical user interface including the plurality of data objects and the plurality of filter icons;

responsive to a selection of the first and second filter icons, updating the graphical user interface to include a listing of only data objects that correspond to the selected filter icons, wherein the historical interaction data is updated based on user interactions with the data objects that correspond to the selected filter icons; and responsive to a request from the user, generating an archive of at least the data objects that correspond to the selected filter icons, despite the user having security permissions precluding the user from reading and modifying at least the data objects that correspond to the selected filter icons.

16. The system of claim 15, wherein:
each of the plurality of data objects is classifiable based on: (i) the content within the respective data object; (ii) the structure of the content within the respective data object; and (iii) the predefined template.

17. The system of claim 15,
wherein the set of filter icons includes a particular filter icon corresponding to two classes of the plurality of classes, wherein the operation further comprises:
responsive to a selection of the particular filter icon, updating the graphical user interface to include at least data objects belonging to the two classes the particular filter icon corresponds to.

18. The system of claim 15, wherein the archive is for use in electronic discovery, wherein the archive is generated to facilitate an electronic discovery process.

19. The system of claim 15, wherein the plurality of data objects comprises at least one of: (i) files on a file system; (ii) objects in a content management system; and (iii) web documents included in a set of search results.

20. The system of claim 15, wherein the plurality of data objects comprises at least one of: (i) files on a file system; (ii) objects in a content management system; and (iii) web documents included in a set of search results.

* * * * *